July 15, 1941.　　　G. M. CARVLIN ET AL　　　2,248,956
METHOD AND MEANS FOR ADSORPTION OF CONDENSABLES FROM FUEL GASES
Filed Aug. 2, 1939
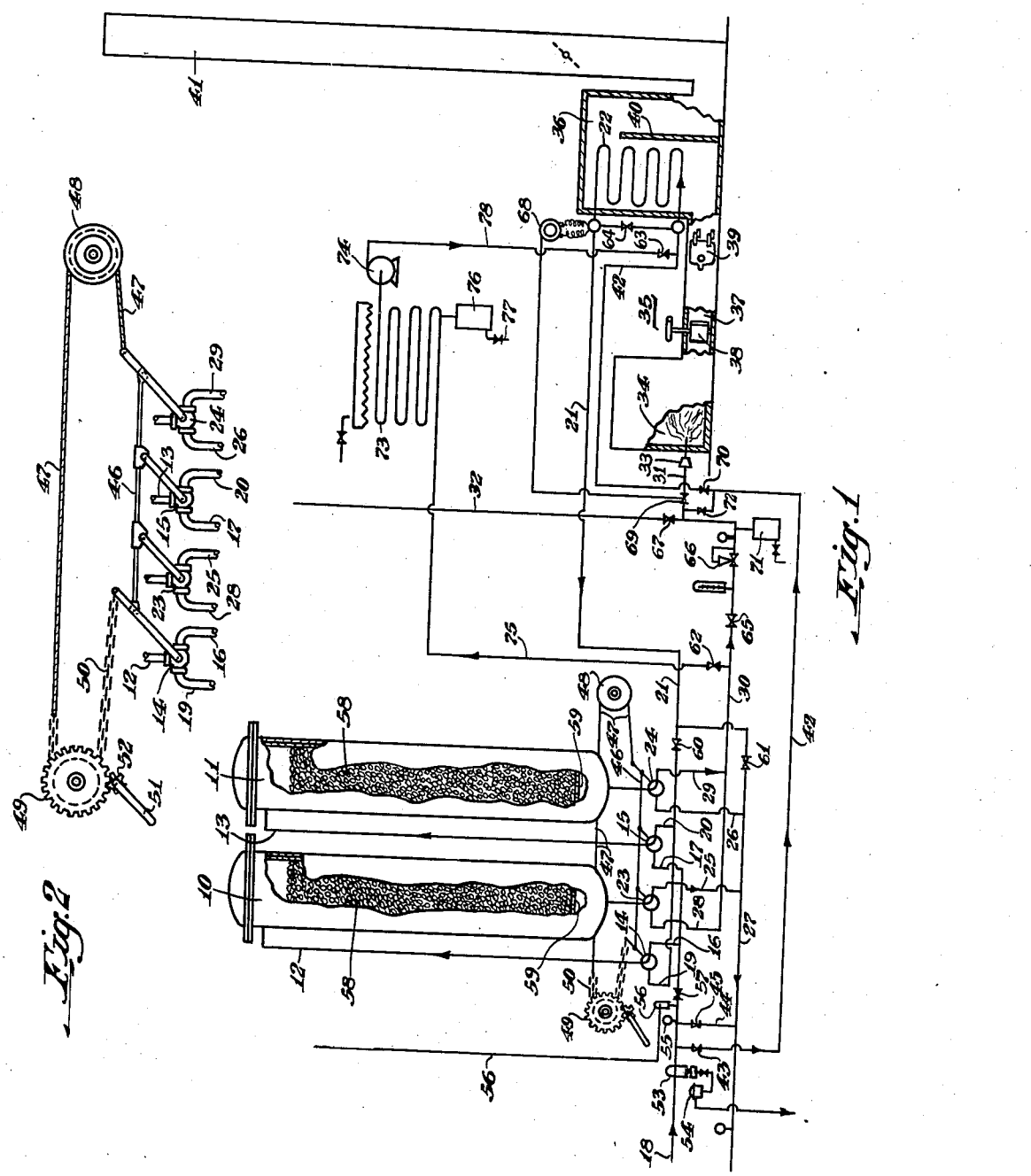
INVENTORS.
GEORGE M. CARVLIN and
WILLIAM O. KEELING
BY
Henry Love Clarke
ATTORNEY.

Patented July 15, 1941

2,248,956

UNITED STATES PATENT OFFICE 2,248,956

METHOD AND MEANS FOR ADSORPTION OF CONDENSABLES FROM FUEL GASES

George M. Carvlin and William O. Keeling, Pittsburgh, Pa., assignors to Koppers Company, a corporation of Delaware Application August 2, 1939, Serial No. 288,028

4 Claims. (Cl. 183—4)

The present invention relates to the art of reducing the humidity of gaseous and vaporous admixtures and is primarily directed to improvements in method and means of utilizing known solid adsorbents of the nature of activated alumina, activated carbon, silica gel, and the like, for removing easily condensable hydrocarbons and more especially water vapor from such fuel gases as natural and manufactured gases that are under relatively high pressure, as for example above two atmospheres.

A significant proportion of the natural gas produced in this country is emergent from wells that are far removed from the more densely populated areas and they are often found in districts so isoloted that sources of water and mechanical power are very expensive commodities if actually available. From well-heads located in such districts, the produced fuel gases are transported by means of pipe-lines to points of consumption that are often hundreds of miles removed from their loci of production. Generally, such gases are conveyed through distributive systems under pressures that are greatly in excess of atmospheric and during their transportation frequently encounter conditions of temperature that at their existing pressures promote the formation of the so-called "gas hydrates" which are compounds stable at temperatures relatively high above the freezing point of water and are capable of forming in the distributive lines obstructions that can seriously impede or even entirely stop the flow of gases therethrough.

These "gas hydrates" characteristically accumulate as crystalline, snow-like bodies and are formed by combinations between water normally present in the untreated natural gas as it emerges from the wells, and such other components thereof as methane, ethane, propane and the like. Natural gas containing its normal quota of water vapor and when at pressures of 20 to 30 atmospheres can have formed therein stable "gas hydrates" at temperatures as high as 44° F. to 51° F. respectively. (See American Gas Association Monthly, vol. 18 (1936), pages 273-6.)

Formation of these compounds can be substantially inhibited by reducing the vapor pressure of water in the hydrocarbons-bearing gas an amount sufficient that aqueous water will not form therein under any of the conditions of temperature or of pressure to which the distributed gas is subjected during its distribution. Obviously, any possibility of the formation of the "gas hydrates" can be entirely obviated by complete removal of all water vapor from the distributed gas, but for most practical purposes so extensive a dehydration is needless expense and it suffices only to provide therein conditions where aqueous water will not separate therefrom under any of the circumstances it encounters in its distributive systems.

An object of the present invention therefore is provision of simple, practical and economical method and means whereby more especially such fuel gas as natural gas can be taken from the well-head and can be continuously introduced into distributive systems therefor with a controllably preferred vapor pressure of water and in a manner quite independently of such extraneous commodities as mechanical or electrical power or water, so that the desired objectives can be realized in the most isolated districts and be practical of operation by workmen of the most elementary experience.

Another object of invention is the provision of method and means for the stated purpose that are adapted and designed to be operative with minimum regulation and with manual power the sole required source thereof.

A further object of invention is to provide for the continuous removal of condensables from gases at higher pressures by means of solid adsorbents in a system wherein during both the adsorption and the reactivation steps the adsorbents are always under substantially the same gaseous pressure and the reactivation is effected by the consumption of only a relative small percentage of the gases treated therein, thereby eliminating troublesome reduction of gaseous pressure above the spent adsorbent during its reactivation and also the accompanying tendency of such practice to dislodge from their normal positions the granules of solid adsorbent.

Further objects of invention are the provision of a simple basic system for continuously controlling the vapor pressure of water in fuel gases that are under higher pressures and also the provision of features that are auxiliary thereto and whereby certain additional but complementary advantages can be realized where their results are of sufficient considered import to justify their additional expense.

Briefly stated, according to the simple basic form of the present invention, condensables are continuously removed from a stream of combustible high-pressure gases in a system comprising a plurality of adsorbers that are charged with granular activated-adsorbent means such as alumina and are disposed for alternately operating, and in alternation with each other, in an adsorption step and a reactivation step for the spent adsorbent, said adsorbers all containing at all times and whether or not they are active or spent or undergoing reactivation, substantially the kind of gas treated in the system and at substantially the same high system-pressure, and reactivation of the spent adsorbers is effected by the simple expediency of flowing therethrough system-gas that has been preheated to a preferred temperature level by combustion of a quantum of system-gas that itself has been previously flowed through a spent adsorber. The preheated system-gas serves two purposes; that is, it operates as a medium for heating the spent solid absorbent thereby increasing the vapor pressure above it of previously adsorbed condensables to liberate them therefrom, and, because of the fact that the condensables-carrying capacity of the system-gas increases with increase in temperature, the preheated system-gas also functions to carry from the spent adsorbers the condensables driven out of spent adsorbent by its heating.

In general, the sensible heat capacity of a gas increases as the pressure thereon is increased so that that feature of the present invention which provides for reactivating spent adsorbent with gas at the same higher pressure as obtained during the adsorption step advantageously makes possible a more rapid flowing of heat into the spent adsorbent than is the case if gas of lower pressure were used for the purpose, thereby decreasing the period during which the system of invention must be under the supervision of an attendant and, in addition, eliminating any required purging of an adsorber before its reactivation is started, all of which assists in achieving an objective of the invention, namely, the provision of a system, for removing condensables from gases, which is of such great simplification that the attendance of an operator will be required for only a small portion of a cycle of its operation to turn valves and light a burner, and that indeed makes expedient the operation of a plurality of relatively-remote units by a single operator.

The present invention also provides features whereby, if preferred, the reactivation gas, always at substantially system-pressure, can be continuously recycled in a closed system having means respectively for its heating and cooling prior to and subsequently of its cyclic flowing into and out of contact with spent adsorbent, the heating being effected by the combustion of a small amount of untreated gas before the recycled activating gas is flowed over the to-be-reactivated adsorbent.

In the accompanying drawing forming a part of this specification and showing for purposes of exemplification a preferred apparatus and method in which the invention may be embodied and practised but without limiting the claimed invention specifically to such illustrative instance or instances;

Fig. 1 is a diagrammatical elevational view, parts in section, of apparatus wherein such condensables as water vapor, and the like, can be removed from gases in accordance with the process of the present invention, the illustrated apparatus being adapted for operating the present invention in its simple, basic form and also for practising modifications thereof in a manner hereinafter described; and Fig. 2 is a more detailed view of a portion of Fig. 1 and illustrating the means for simultaneously operating the inlet and outlet valves of the active and the to-be-reactivated adsorber, so that said adsorbers can be changed to opposite phases of their cyclic operation by simple unidirectional movement of a rod or cable to which the handles of the said valves are attached.

The same characters of reference designate the same parts in each of the views of the drawing.

The apparatus illustrated in the drawing comprises essentially two adsorbers that are charged with solid adsorbent for condensable vapors and are so arranged, for employment in alternation in an adsorption step followed by a reactivation step for the spent adsorbent, that adsorption of condensables takes place in the one adsorber during the time the other is being reactivated and consequently a stream of raw gas continuously flowed into the apparatus can be continuously divested of condensables.

Since, according to the present improvement, fuel gas having the same origin and under substantially the same conditions of pressure is flowed through the illustrated adsorbers during both the adsorption and reactivation steps of the improved process, each adsorber is provided with means whereby it is individually and optionally communicably connectable by means of three-way valves with two separate piping systems, the one system comprising means for flowing to-be-treated gas into and out of each adsorber and the other comprising means for flowing the reactivating gas serially through a heating coil, a spent adsorber and thence into combustion means where used reactivation gas is burned to preheat a new quantum of reactivation gas. The apparatus will be more clearly understood by reference to the drawing.

In Fig. 1 the adsorbers 10, 11, which are each charged with some preferred solid adsorbent for vapor such as activated alumina, charcoal, silica gel, or the like, are communicably connectable at their tops by means respectively of riser-pipes 12, 13, the three-way valves 14, 15, and branch-pipes 16, 17, with the principal inlet-pipe 18 to the adsorption system and also by means of branch-pipes 19, 20, and by the said same three-way valves they are communicably connectable with pipe 21 which is an extension from the upper end of the heating coils 22 wherein that system-gas used for reactivation of spent solid adsorbent is raised to a preferred temperature. The bottoms or outlet ends of said adsorbers 10, 11, are each communicably connectable as preferred respectively by means of three-way valves 23, 24, and of branch-pipes 25, 26, with principal adsorber-outlet pipe 27 for flowing de-vapored gas from the adsorption system, and also by means of the said valves 23, 24, and branch-pipes 28, 29, the bottom of adsorbers 10, 11, are each respectively connectable individually, during the period of their reactivation, with pipe 30 that furcates into two terminal pipes 31, 32, the former leading to burner 33 located inside combustion-chamber 34 of furnace-setting 35 and wherein reactivating gas is heated before it is introduced into a spent adsorber, whereas the latter leads to the atmosphere into which there is bled from the adsorption system such of the required reactivation gas as has flowed through a spent adsorber but which is in excess of that amount needed to preheat new volumes of reactivation gas to a preferred temperature.

Furnace-setting 35, employed for preheating that volume of system-gas employed to reactivate spent solid adsorbent, is preferably formed somewhat like a Dutch-oven and having combustion-chamber 34 relatively remote from heating chamber 36 wherein there are the coils for preheating the reactivation gas, the two said chambers being interconnected by flue 37 of substantial length and containing a draft-damper 38 and a draft-door 39 through which outside air can be drawn into flue 37 when preferred. By providing flue 37 with substantial length, there is promoted, before it has reached heating-chamber 36, a complete combustion of that system-gas which is burned in combustion-chamber 34 as well as also a uniform admixing and temperature of its combustion-products by the time they arrive at and flow over heating-coils 22, thereafter to pass across the top of deflecting wall 40 and into stack 41.

Such construction reduces the danger of locally overheating the heating coils and is therefore substantial protection against the possibility of locally cracking reactivation-gas flowed through them.

At their lower or inlet end, heating coils 22, wherein a small proportion of system-gas is preheated for purposes of adsorbent reactivation, are communicably connected by pipe 42 with inlet-pipe 18 to the adsorption system, the said pipe 42 being provided with valve 43 whereby there is regulated the volume of such gas that is admitted into the coils. The inlet and the outlet pipes respectively 18, 27, for the adsorption system are interconnected by means of branch-pipe 44, containing valve 45, whereby when expedient, a preferred volume of raw gas entering the adsorption system can be by-passed around the adsorbing adsorber and introduced directly into gas that has passed through an active bed of adsorbent, thereby serving as means whereby the dew-point of adsorber-treated gas can be adjusted to a preferred temperature above that at which it issues from an active bed.

In the enlarged view, Fig. 2 of a portion of the apparatus illustrated in Fig. 1, there is shown in greater detail simple and effective means whereby three-way valves 14, 15 and 23, 24, that respectively regulate the flow of gases into and out of adsorbers 10, 11, can be simultaneously moved between preferred operating positions. Inasmuch as the present improvement in methods and means for removing vapors from gases has been developed primarily for use in remote and isolated areas where power-generating means or sources of power are not commonly existent, valve-operating device of Fig. 2 is shown as disposed for manual operation although it is obvious that in those localities where it is expedient or desirable, it is within the skill of the art to adapt the illustrated device to mechanical actuation. The substantial mechanical advantage for operating the valvular system manually has been provided in contemplation of its employment for regulating the flow of such gas as natural gas that is under relatively high pressure.

Three-way valves 14, 15 and 23, 24, must be of a type suitable for satisfactory operation at higher pressures, for example 400 lbs. per sq. in., and at temperatures ranging from atmospheric to about 320° C. High-pressure Merco-Nordstrom valves have been found suitable for the purpose. Operating-handles of the said three-way valves are adjustably affixed to a suitable rod 46 in such manner that any preferred portion of their full opening can be used and that at such times as said rod is moved from a given position to either the right or the left by force applied to one of the valve handles, the entire assembly thereof will move in unison in the same direction. In Fig. 2, the valve handle at the extreme right is attached to wire-rope 47 which is passed over sheave 48, said rope being attached at some distance from sprocket-wheel 49 to a length of chain 50 comprising links that are adapted to receive the sprockets of wheel 49 and to be moved along therewith during its rotation which can be effected by turning the crank-handle 51 that is attached to the pinion gear of the spur-geared wheels 49, 52.

According to the invention, adsorbers 10, 11, are adapted to be used in alternation and in such manner for removing condensables from gases that a continuous stream thereof can be treated without significant interruption of their flow. In Fig. 1, the pipe-connecting and flow-regulating valves of the adsorbers are shown as they are disposed during that period of cyclic operation of the apparatus when adsorber 10 is the active one and adsorber 11 is being reactivated, the cores of the valves associated with adsorber 10 being arranged to include it in the piping system comprising the apparatus inlet and outlet pipes respectively 18, 27, whereas the cores of the valves associated with adsorber 11 are arranged to include the same in the piping system comprising heating coils 22 and burner 33.

At such time as the adsorbing capacity of the solid adsorbent in adsorber 10 has reached a preferred limit of saturation with condensable vapor, rod 46 is then so moved as to reverse the position of all the valves that it communicates with, the previously reactivated adsorber 11 thus becoming the adsorbing adsorber whereas spent adsorber 10 is placed in the flow-path of the reactivation-gas and, in so doing, the illustrated apparatus thereupon enters the other period of its cyclic operation.

The process of the invention in its simplest form is carried out by means of the above-described apparatus as follows:

Raw fuel-gas, such for example as natural gas from which condensable vapors such as those of water are to be removed, is flowed from the well-head directly into inlet-pipe 18 of the adsorption system at substantially rock pressure and as it flows therealong, in the direction indicated by the arrows, it passes through water-separator 53 that is arranged to remove from the gas mechanically entrained water, said separator being provided with trap 54 that is adapted to discharge from the system, without loss of pressure, liquids accumulated by said separator. Issuing from the water-separator, the to-be-treated gas is flowed in turn past pressure-gauge 55, safety valve 56, through throttle-valve 57 to the branch-pipe 16 that is communicably connectable with riser-pipe 12 which discharges into the top of adsorber 10.

Upon entering adsorber 10, the flow-direction of the vapors-bearing gas is changed and it is directed downwardly over the bed 58 of activated alumina, a substance preferred in consequence of its relative cheapness per unit charge, and wherein water-vapors and the like are adsorbed from the treated gas. The treated gases are preferably flowed downwardly over the bed of adsorbent so that the kinetic energy of the gas will not tend to dislodge adsorbent particles of the bed but rather the contrary and so that advantage may be thus taken of the bed and its supporting means 59 to function as a sort of filtering agency to remove from the treated gas such adsorbent granules as may become entrained therein. Leaving the bottom of adsorber 10, the de-vapored gases flow respectively through valve 23, branch-pipe 25 into outlet-pipe 27 to the adsorption apparatus, and thence to any preferred disposition.

The effectiveness of the alumina of adsorbent bed 58 will depend in part on the quantity of such material per unit charge and on the velocity and volume of gas treated thereby. In the event the treated gas leaving the adsorber has had its dew-point in respect of a condensable or condensables, reduced to below that required or desired in its further utilization, the dew-point can be simply restored to a desired level by an appropriate adjustment of valve 45 which will permit an optional proportion of the untreated gas entering the apparatus to by-pass the adsorbers and to flow directly into pipe 27 and there commingle with treated gas as it flows from the apparatus of invention, thereby raising the dew-point of the effluent mixture.

Sometime during that period of its operating cycle wherein adsorber 10 is operating to adsorb vapors from gases, the spent adsorber 11, which is disposed for adsorption in alternation with adsorber 10, is reactivated. As clearly apparent in Fig. 1, adsorber 11 is there shown communicably connected by means of three-way valves 15, 24, with the second of the hereinabove mentioned piping systems of the improved apparatus; that is, it is included in the flow-path for that quantity of system-gas employed for reactivation. At the end of that just prior vapor-adsorption cycle wherein the adsorbent of adsorber 11 had become spent and at the time adsorber 10 had been changed from its reactivation to its adsorption phase by opening valves 14, 23, leading respectively to pipes 18, 27, the inlet and outlet valves respectively to adsorber 11 had been also simultaneously turned, by the same movement of rod 46, to connect adsorber 11 for its reactivation, with respectively pipes 21, 30.

This reversal of the flow-control valves was made without effecting any substantial alteration in the gas pressure existing in the spent adsorber 11 into which raw inlet gas is still able to flow at substantially system-pressure from apparatus-inlet pipe 18 respectively by way of valve 43, pipe 42, opened valve 70, heating coils 22, opened valve 60 and three-way valve 15, and from which adsorber the reactivation gas can leave by way of valve 24, branch-pipe 29, pipe 30, opened valve 65, and pressure regulator 66, to enter burner 33 for combustion. During this method of effecting reactivation of the spent adsorbent in the illustrated apparatus, the valve 61 is closed as are also valves 62, 63, 64, and 72 and to all of which reference will be made hereinafter.

According to the present invention therefore both adsorbers during both periods of their cycles of operation have gas from the same source flowed therethrough under substantially similar conditions but with the difference however that during the period of reactivation that gas which enters the spent adsorber is relatively highly preheated by the combustion of gas that has just previously flowed through the bed of spent adsorbent. In those instances where the chosen active adsorbent material is alumina, the reactivation-gas is preferably not preheated to a temperature more than is necessary to heat the alumina to about 320° C.

The preheated reactivation-gas as it comes into contact with spent adsorbent raises the temperature of the same and also the vapor pressure thereabove of such condensables as water vapor, and the like, adsorbed thereby during the previous period of operation to re-vaporize them and transfer them into the downwardly flowing current of heated gases and, in this manner, flush them out of the spent adsorbent and adsorber. The mixture of somewhat cooled reactivation-gas and removed condensables thereafter passes to burner 33 and is burned. Hydrocarbonaceous condensables contained in said mixture are of course burned along with the reactivation-gas whereas removed water vapor is admixed with those combustion-products from the burner that pass to stack 41.

Thus, according to the simplest method of operating the illustrated apparatus, gases that have been flowed through the adsorbent-reactivation step are burned to preheat new volumes thereof and in general any gas that is employed for reactivation purposes as well as also the condensables removed thereby from the solid adsorbent are in greater part unavailable for other utilization. In those instances, however, where the raw gas is of higher calorific value and the volume thereof required to be flowed through a spent adsorber for effecting a preferred degree of reactivation contains more available heat of combustion than is required to maintain the inflowing reactivation-gas at a preferred temperature, that quantity of used reactivation-gas in excess of demands for preheating purposes may be discharged from the system through vent-pipe 32 by appropriate adjustment of valve 67; the so-vented gas may be either wasted into the atmosphere or it may be treated for the recovery of any valuable condensable hydrocarbons by, for example, flowing it through another bed of adsorbent or by condensation. The volume of vented gas can be automatically regulated by the temperature of the preheated gases leaving heating coils 22. Practical means for such purpose has been found to be the Foxboro Temperature Stabilog 68 which is sensitive to changes in temperature of the gases issuing from heating coils 22 and functions to transmit, through a therewith communicating fluid-filled system, impulses to controlled valve 69 which adjusts the flow of reactivation-gas to burner 33 in response to the demands for heat of the gases effluent to the heating coils and permits excess reactivation-gas to vent through pipe 32.

Pressure-reducing valve 66, in pipe 30, serves both to maintain system-pressure on adsorber 11 during its period of reactivation and also to permit discharge therethrough into the burner of spent reactivation-gas. Drip-pot 71 serves as a receptacle for segregation and removal from the apparatus of such condensates as may separate from spent reactivation-gas in consequence of the pressure-reduction by said valve 66. By means of valve 64, a portion or all of the reactivation-gas can be by-passed around heating coils 22.

As before stated, the sensible heat capacity of a volume of gas varies approximately directly with the pressure thereon so that that novel feature of the invention which provides for reactivation of spent adsorbent with high-pressure gas at substantially the pressure of adsorption is of great advantage because the thermal capacity of the reactivation-gas is thus high, a fact which permits a rapid transfer of heat to the spent adsorbent, and, in addition, it tends to obviate overheating and cracking of the reactivation-gas and eliminates the inconvenience of intermittently reducing the gas pressure on the adsorbers and thus advantageously to decrease the time required for the supervision of an operator.

The time required for reactivation of a spent adsorber is normally only a fraction of an adsorption period, the relationship between a unit charge of adsorbent and the volume of high-pressure gas to be treated and its content of to-be-removed condensables being so calculated that an adsorbing adsorber is uninterruptedly operative for a preferably 24-hour period. Furnace-setting 35 and heating coils 22 therein are therefore for a considerable portion of an operating period not in use because there is no need of continuing the flow of preheated gas through the adsorber after reactivation is effected. The flow of reactivation-gas into the reactivated adsorber 11 can be discontinued by simply closing valves 65, 67, which will prevent a current of raw gas entering the reactivation system through valve 43, and will extinguish the flame in the combustion chamber but will still maintain said system under system-pressure.

Such simple practice, although effective, would have the disadvantage that for a considerable period after the flow of gas through the heating coils has been so interrupted, they would be filled with quiescent hydrocarbonaceous gas that is subjected to heat radiated from the hot walls of heating chamber 36, and which would crack them and eventually fill the coils with an impenetrable deposit of elemental carbon. Circumvention of such a potential difficulty is easily effected in the following manner. The solid adsorbent in adsorber 11 having been reactivated, as above described, and valves 65, 67 closed, as is already the case with valve 72, raw gas can be continued flowing through the hot coils in regulable amounts to cool them by opening valve 61 which allows untreated system-gas to flow through pipe 42, heating coils 22, pipe 21 and into the system-outlet pipe 27 where it mixes with the de-vapored gases leaving active adsorber 10 to raise their dew-point to a preferred level. By closing valve 45 at this juncture, the entire volume of raw gas employed for adjusting the dew-point level of the system-outlet gas can be flowed through the heating coils to cool them and their surrounding setting. Closing valve 60 will completely isolate the newly reactivated adsorber 11 against ingress of untreated gas.

For those applications of the present improvement where it is practical so to do and the condensables, such as casing-head gasoline incidentally removed from treated gas during operation of the improvement for gas dehydration purposes, are of sufficient value to warrant their recovery during the step of adsorbent-reactivation, instead of wasting them into the atmosphere or burning them to preheat the reactivation gas, reactivation of a spent adsorber can be carried out as follows by means of equipment, also illustrated in Fig. 1, and of a method of operating the same, the both of which may be considered as auxiliary to the simple basic improvements but when however employed in combination therewith, provide certain additional advantages.

The condensables adsorbed from a volume of high-pressure gas according to the present improvement are contained in the warm reactivation-gas leaving the outlet of an adsorber undergoing reactivation and their partial pressure therein is greatly in excess of that at which they were contained in the raw gas. Cooling of this warm reactivation-gas precipitates condensables which separate therefrom as liquids thus restoring the condensables-carrying capacity of the reactivation-gas which after being preheated can be again employed in the step of adsorbent reactivation.

According to a modification of the basic thought of the present improvement, therefore, reactivation-gas is continuously recycled in series between a spent adsorber, means for cooling the spent reactivation gas and separating therefrom substances condensed by such cooling step, and other means for preheating the so-separated reactivation-gas before it is recycled to a spent-adsorber inlet. In this modified method of operation, the recycled reactivation-gas is preheated by the combustion of a small proportion of the raw gas that is inlet to the system.

In those instances therefore, when it is desired to recover from a spent adsorber, the condensables contained therein instead of utilizing them in admixture with reactivation-gas for preheating purposes, the apparatus shown in Fig. 1 can be converted to provide such results by simply arranging in the following manner to include cooling coils 73 and blower 74 in the flow-path of reactivation-gas leaving spent adsorber 11. Open-valves 61, 65, 67, 70 are adjusted into a closed position and valves 62, 63 are opened thereby permitting spent reactivation-gas from adsorber 11 to flow from three-way valve 24, into branch-pipe 29, pipe 30, through valve 62, and by means of pipe 75 into cooling coils 73 wherein said reactivation-gas is cooled and condensables are precipitated therefrom to collect in vessel 76 from which they can be discharged through valved drain-pipe 77. Cooling coils 73 may be water-cooled, as indicated in the figure, in those districts where water is conveniently available or they may be made of a length sufficient to function as atmospheric coolers. Freed of condensables, the reactivation-gas is taken from the outlet of the cooling coils by blower 74 and flowed in pipe 78, through valve 63 into heating coils 22 and thence through pipe 21, opened valve 60 and three-way valve 15 into the top of the spent adsorber, the reactivation-gas so entrapped in the said circuit being continuously recycled until adsorber 11 has been reactivated to a preferred degree. Preheating of the so-recycled reactivation-gas results from the combustion in burner 33 of raw gas fed thereto from system-inlet pipe 18 through valve 43, pipe 42 and valve 72, so that the flow of heating gas in this modified method of operation is still regulated by controlled valve 69. Blower 74 need be only of sufficient size to overcome gaseous friction in the described circuit, and any reactivation-gas lost thereto by leakage can be replaced by opening valve 70. In the event that no other source of power is available, blower 74 can be driven by an internal-combustion engine employing hydrocarbons recovered from the spent adsorbent in vessel 76.

In apparatus of the type illustrated in the drawing that is adapted to treat in a single adsorber 8,000,000 cu. ft. per day of natural gas having a pressure of 450 lbs. per sq. in. and a dew-point of 70° C. in respect of water-vapor, and is further adapted to reduce the water-vapor dew-point of that gas volume to 35° F., a spent adsorber is reactivatable in a four-hour period by flowing therethrough a total of approximately 2400 cu. ft. of the same natural gas at 450 lbs. pressure per sq. in. when it is preheated to 500°

F. For the preheating of this volume of reactivation-gas, the combustion of only approximately 35 cu. ft. of the natural gas measured at 450 lbs. pressure per sq. in. is required. That is, the combustion of only approximately .0004% of the gas treated is adequate to furnish the heat required for reactivation of the resultant spent adsorbent and only approximately 0.03% of the total gas treated needs be flowed therethrough at 500° F. to effect said reactivation.

The time required in reactivation of a spent adsorber is not necessarily limited to the above-stated four-hour period because such period can be increased or decreased as preferred by providing a piping system for the reactivation step that is of correspondingly larger or smaller dimensions, it being only necessary to bring the spent adsorbent into contact with approximately 0.03% by volume of the total volume of high-pressure gas treated and at the stated temperature.

As will be now apparent to those experienced in the art, the hereinabove described improved apparatus and method of operating the same is successfully employable with a minimum of supervision and, in its simplest form, the presence of an operator is required for only a fraction of a work-day so that more than one such installation can be supervised by a single individual. The adsorbers that function in alternation as the active adsorber are preferably of such capacity as to hold a day's requirement of adsorbent; reactivation of a spent adsorber can be easily carried out in 4 hours or less; and the ordinary supervisory requirements are: once in a 24-hour period to reverse the positions of the three-way valves controlling the inlets and outlets to the adsorbers, by a simple one-way movement of a bar to which they are all affixed; to ignite and to extinguish fuel gas introduced into the furnace setting; and, following completion of the reactivation period, by the turning of a single valve to direct raw gas, that is by-passed around the adsorbers for regulation of the dewpoint of the adsorber-treated gas, through the heating coils for their cooling and thence into the system-outlet pipe.

The invention as hereinabove set forth is embodied in particular form and manner but may be variously embodied within the scope of the claims hereinafter made.

We claim:

1. In a system for continuously removing a condensable from a stream of combustible gas containing the same, said system comprising a plurality of batches of solid adsorbent for said condensable, in combination, the steps of: flowing a major portion of the said gas-stream and at pressures considerably in excess of atmospheric into contact with a batch of adsorbent that is active to remove a condensable from said gas; simultaneously and at substantially the same pressure, flowing a minor, preheated portion of gas from the gas-stream into a closed cycle into successive direct contacts with another batch of adsorbent that contains previously adsorbed condensable, thereby to reactivate said adsorbent, and subjecting the gas in the closed cycle after each such contact respectively to a cooling step and a preheating step for condensing therefrom the condensable removed thereby from said other adsorbent batch, and for restoring its condensable-carrying capacity before the next following contact with said adsorbent, burning gas derived from said gas-stream's minor portion; effecting the aforesaid preheating by heat absorbed from the combustion products; and periodically alternating contact of the said adsorbent batches with such major and minor portions of the said gas-stream.

2. In a system for continuously removing a condensable from a stream of combustible gas containing the same, said system comprising a plurality of batches of solid adsorbent for said condensable, in combination, the steps of: flowing a major portion of the said gas-stream and at pressures considerably in excess of atmospheric into direct contact with a batch of adsorbent so as to remove a condensable from the gas; simultaneously and at substantially the same pressure flowing a minor, preheated portion of the gas-stream into direct contact with another batch of adsorbent that contains previously adsorbed condensable, thereby to reactivate the said other adsorbent-batch, withdrawing said minor portion from contact with said other adsorbent batch; burning gas withdrawn from contact with said other batch, effecting said preheating by indirect heat exchange of the gas to be preheated while in flow through preheating means heated by the aforesaid burning of gas that has been previously in contact with said other adsorbent batch; interrupting the combustion process and shutting off the flow of preheated gas from the preheating step to the adsorbent batch while continuing flow through said heating means of a minor portion of the gas-stream and introducing such gas from the preheating means directly into gas that is effluent to the first said adsorbent-batch, thereby to cool said preheating means and to regulate the partial pressure of condensable in the system-outlet gas; and periodically alternating contact of the said adsorbent batches with such major and minor portions of the said gas-stream.

3. Apparatus for removing a condensable from natural gas at a long distance distribution pressure comprising a plurality of adsorbers, adapted each for co-operation in alternation with another as an active adsorber and as a reactivating adsorber, a source of to-be-treated natural gas under said pressure, a device for preheating natural gas, means for delivering the treated natural gas to distribution, and a device for burning reactivation gas discharged from the adsorbers connected with the device for preheating natural gas for supplying the preheating heat thereto, and means whereby the inlet to each adsorber is alternately communicably connectable with the source of to-be-treated gas while another is connected with the device for preheating such gas, and the outlet to each such adsorber is similarly communicably connectable with the means for delivering the treated natural gas to desired distribution while another is connectable with the device for burning reactivation-gas discharged from the adsorbers, said means comprising three-way valves individually controlling each inlet and outlet of the said cooperative adsorbers, the said three-way valves being all co-operatively interconnected for simultaneous movement by manually operable means operable from a single point, so that the active adsorbers can all be switched to their reactivating phases and adsorbers in reactive phase switched to active phase by force applied manually at a single point.

4. In a system for continuously removing a condensable from a stream of natural gas for conveyance through long distance distribution systems under pressure therefor, said system comprising a plurality of batches of solid adsorbent for said condensable, the steps of: flowing a major portion of said gas-stream at distribution pressure of the order of 450 lbs. per sq. in. into direct contact with a batch of adsorbent so as to remove a condensable from the gas; simultaneously, but only for a very minor portion of the period of operation of said absorption stage, and at substantially the same pressure of the order of 450 lbs. per sq. in., flowing a minor, preheated portion of the stream of natural gas into direct contact with another batch of the adsorbent containing previously adsorbed condensable, thereby to reactivate the latter adsorbent; withdrawing the minor portion from contact with the batch; burning a minor portion of the natural gas; effecting said preheating by heat absorbed from the combustion products of the burnt natural gas; and periodically alternating contact of the adsorbent batches with such major and minor portions of the stream of natural gas.

GEORGE M. CARVLIN.
WILLIAM O. KEELING.